United States Patent [19]

Tatman et al.

[11] Patent Number: 5,489,646

[45] Date of Patent: Feb. 6, 1996

[54] LOWER ALKYL BIPHENYLS AS PLASTICIZERS

[75] Inventors: Jack B. Tatman; Gregory R. Hahn; Harold W. Earhart, all of Corpus Christi, Tex.

[73] Assignee: Koch Industries, Inc., Wichita, Kans.

[21] Appl. No.: 179,424

[22] Filed: Jan. 10, 1994

[51] Int. Cl.$^6$ ............................................. C08K 5/01
[52] U.S. Cl. .......................... 524/848; 524/474; 524/476; 524/486; 524/571; 524/700; 524/856
[58] Field of Search ...................... 524/486, 700, 524/474, 476, 571, 848, 856

[56] References Cited

U.S. PATENT DOCUMENTS

| | | | |
|---|---|---|---|
| 2,172,391 | 9/1939 | Krase | 524/486 X |
| 2,438,516 | 3/1948 | New | 524/486 |
| 2,449,928 | 9/1948 | Corkery | 524/476 |
| 2,750,349 | 6/1956 | O'Herren | 524/486 X |
| 2,786,040 | 3/1957 | Dazzi | 524/475 |
| 2,897,236 | 7/1960 | Dazzi | 260/75 |
| 2,925,398 | 2/1960 | Coran et al. | 524/486 |
| 2,945,832 | 7/1960 | Dazzi | 524/297 |
| 2,967,164 | 1/1961 | Aries | 524/486 X |
| 3,380,951 | 4/1968 | Frey | 524/486 |
| 3,558,418 | 1/1971 | Porter et al. | 524/486 X |
| 3,567,673 | 3/1971 | Payette | 524/486 X |
| 3,803,072 | 4/1974 | Graham et al. | 524/486 X |
| 4,294,742 | 10/1981 | Rugen et al. | 524/486 X |
| 5,070,131 | 12/1991 | Rhodes et al. | 524/486 X |

FOREIGN PATENT DOCUMENTS

| | | | |
|---|---|---|---|
| 0080322 | 6/1975 | Japan | 524/486 |
| 0777545 | 6/1957 | United Kingdom | 524/486 |

*Primary Examiner*—Judy M. Reddick
*Attorney, Agent, or Firm*—Shook, Hardy & Bacon

[57] ABSTRACT

A significantly improved plasticizer-polymer composition embraces a polymer containing a di-, tri- and/or tetra- ethyl-, propyl- and/or butylbiphenyl plasticizer which constitutes the major proportion by weight of any other plasticizing/softening additive, provided that the polymer is not polyvinyl chloride and when the polymer is an elastomer or rubber, or is a polystyrene, said plasticizer is diisopropylbiphenyl and/or triisopropylbiphenyl, and when the polymer is of a plastisol, essentially no ester plasticizing additive is present. As well, a polymer fabrication composition comprises a monomer and/or oligomer component in combination with said plasticizer. A method for preparing the plasticizer-polymer composition and/or the fabrication composition comprises contacting the monomer and/or oligomer component with said plasticizer, mixing to provide a uniform mixture, and carrying out further processing as may be desired so as to optionally prepare the plasticized-polymer composition. For instance, thermosets such as epoxies and polyurethanes and elastomers such as polybutadienes and other polymers can have high loading levels of the plasticizer employed without sacrifice of plasticized polymer properties. Moreover, the high loading capacity in many cases can represent a significant increase over that found from prior art plasticizing/softening additives.

2 Claims, No Drawings

LOWER ALKYL BIPHENYLS AS PLASTICIZERS

FIELD OF THE INVENTION

Of concern are lower alkyl substituted binuclear aromatic hydrocarbon plasticizers useful in the processing of rubbers or synthetic plastics.

BACKGROUND OF THE INVENTION

As is known in the art, plasticizing and/or softening additives are employed for a variety of reasons. Among these are facilitation of processing, and increasing flexibility and toughness of the polymer. In addition, there are cost advantages resulting from the substitution of a less expensive plasticizer in a formulation for a more expensive monomer or for another more expensive plasticizer.

Among the more important plasticizing additives are nonvolatile organic liquids and low-melting solids, for example, phthalate, adipate and sebacate esters, polyols such as ethylene glycol and its derivatives, tricresyl phosphate, castor oil, and the like.

Dibutyl phthalate (DBP) is a common plasticizing additive of choice for nitrocellulose lacquers, elastomers, and such thermosets as polyurethanes and epoxies. In use, for example, with epoxy resins, DBP may be used as a plasticizing additive with loading levels up to about 10 percent by weight (wt %) at which level desirable properties begin to be adversely affected. Analogs of the phthalate such as the dioctyl compound (DOP) are often similarly employed. The phthalates are oxygenated hydrocarbons.

Other plasticizing/softening additives for elastomers, epoxies and polyurethanes include styrenated tetralins such as ACTREL 400. Of course, styrene is an arene, but tetralin, i.e., tetrahydronaphthalene, is a bicyclic alkane.

Certain alkylbiphenyls have been generally mentioned as plasticizing/softening additives for certain polymer systems. For example, in U.S. Pat. No. 2,449,928, it is disclosed that certain binuclear aromatic compounds, which generally include alkyl- and alkenyl-substituted analogs, for example, phenyl styrene, i.e., 2-ethenylbiphenyl, can be employed to plasticize elastomers such as synthetic rubbers and rubber-like plastics to include elastolenes such as butadiene polymers and copolymers, particularly copolymerized with acrylic nitrile. In U.S. Pat. No. 2,786,040, it is disclosed that alkylated biphenyls such as isopropylbiphenyl and diisopropylbiphenyl can be employed to plasticize polystyrene-type water-base emulsion paints.

Other plasticizing/softening additive modifications are known. For example, in U.S. Pat. No. 2,897,230, it is disclosed that certain aromatic precursors could be condensed with a fumaric acid to provide oxygenated adducts particularly useful to plasticize polyvinyl chloride (PVC) and certain copolymers of PVC. In U.S. Pat. No. 2,945,832, it is disclosed that a plastisol coating such as made from PVC liquid dispersions could be improved, for example, to make them thinner by employment of a combination of ester plasticizing additives, e.g., DOP, with an alkylbiphenyl, e.g., isopropylbiphenyl, or butyl fumarate with diisopropylbiphenyl.

SUMMARY OF THE INVENTION

The present invention provides for a significantly improved plasticizer-polymer composition. In one aspect, the composition comprises a polymer containing a di-, tri- and/or tetra-ethyl-, propyl- and/or butylbiphenyl plasticizer which constitutes the major proportion by weight of any other plasticizing/softening additive, provided that the polymer is not polyvinyl chloride and when the polymer is an elastomer or rubber, or is a polystyrene, said plasticizer is di- and/or triisopropylbiphenyl, and when the polymer is of a plastisol, essentially no ester plasticizing additive is present. In a second aspect, a polymer fabrication composition comprises a monomer and/or oligomer component in combination with said plasticizer. In a third aspect, a method for preparing the plasticizer-polymer composition and/or the fabrication composition comprises contacting the monomer and/or oligomer component with said plasticizer, mixing to provide a uniform mixture, and carrying out further processing as may be desired so as to optionally prepare the plasticized-polymer composition.

The invention is useful in plasticizing polymers.

Significantly, high loading levels of the plasticizer employed with this invention are now possible without sacrifice of the desired plasticized polymer properties. Moreover, the high loading capacity in many cases can represent a significant increase over that found from prior art plasticizing/softening additives. Furthermore, plasticizers employed herein may provide good economic advantage. Numerous further advantages attend the invention.

DETAILED DESCRIPTION OF THE INVENTION

Each patent cited herein is incorporated by reference.

The plasticizer component employed in this invention is simply termed "plasticizer" whether or not its properties in the polymer composition are considered to be true plasticizers, which may be considered to act by internal modification (solvation) of polymer molecules as by replacement of some internal polymer secondary valence bonds with plasticizer-to-polymer bonds, or mere softeners, which may be considered to generally not enter into chemical combination with polymer molecules, or to be of any other category. Distinctions between plasticizing and softening effects may be difficult to discern. However and without wishing to be bound thereby, the plasticizers employed in accordance with the present invention are believed to be generally non-reactive.

The term "plasticizing/softening additive" refers to any added components considered to have plasticizing or softening effect whether or not they are a "plasticizer" of the invention.

In general, the plasticizers of the invention are di-, tri and/or tetra- ethyl-, propyl- and/or butylbiphenyl compounds, i.e. diethylbiphenyl, triethylbiphenyl, tetraethylbiphenyl, dipropylbiphenyl, tripropylbiphenyl, tetrapropylbiphenyl, dibutylbiphenyl, tributylbiphenyl, and/or tetrabutylbiphenyl compounds, or a mixture of such compounds and/or isomers thereof. Of these biphenyls, plasticizers among the propyl varieties are desirably employed, especially as di- and/or triisopropylbiphenyl(s).

Isomer mixes among these biphenyls are possible and are within the scope of the invention. For example, diisopropylbiphenyl can include, or be essentially, 4,4'-diisopropylbiphenyl; 3,3'-diisopropylbiphenyl; 2,2'-diisopropylbiphenyl; 2,4'-diisopropyl-biphenyl; and so forth. Diisopropylbiphenyl can also include, or be essentially, 2,4-diisopropylbiphenyl, and so forth. Typically herein, diisopropylbiphenyl contains the following isomers: 3,5-diisopropylbiphenyl, 3',3'-diisopropylbiphenyl, 3',4'-diisopropylbiphenyl, and 4,4'-diisopropylbiphenyl. Further, triisopropylbiphenyl can include, or be essentially, 2,4,4'-triisopropylbiphenyl; 2,4,3'-triisopropylbiphenyl; 2,4,5-triisopropylbiphenyl; and so forth. Typically herein, triisopropyl-biphenyl contains the following isomers: 3,5,3'-triisopropyl-biphenyl and 3,5,4-triisopropylbiphenyl. Isomer ratios may be varied by suitable methods, as desired.

Ratios of substituted biphenyls can vary as well. In general, a suitable ratio is employed. For purposes of illustration, ratios of the biphenyls may be as in the following table, with parts listed by weight:

TABLE OF SOME BIPHENYL COMPONENT RATIOS

|           | Di-    | Tri-   | Tetra- |
|-----------|--------|--------|--------|
| General   | 0–100  | 0–100  | 0–100  |
| Preferred | 0–100  | 0–100  | 0–20   |
| Desirable | 20–90  | 10–60  | 0      |

The plasticizers can be made by known methods.

When the polymer is an elastomer or a polystyrene, the plasticizer is di- and/or triisopropylbiphenyl and preferably it is a di-triisopropylbiphenyl mixture.

The plasticizer component of the present invention constitutes the major proportion by weight of any plasticizing/softening additive, and it may constitute nearly all, if not completely all, of the plasticizing/softening additives. When the polymer is of a plastisol other than polyvinyl chloride, essentially no ester plasticizing additive is present. For reasons not presently understood, the plasticizers of the present invention are not effective when used with polyvinyl chloride.

The plasticizer of this invention is added to make the plasticizer-polymer composition of the invention by contacting a suitable monomer and/or oligomer component with said plasticizer, mixing to provide a uniform mixture, and carrying out further processing as may be desired so as to prepare the composition. In general, the contact with the monomer and/or oligomer component and the mixing are done at suitable times and in suitable manners, typically analogous to those employed in the art to make analogous polymer compositions with other plasticizing/softening additives.

As may be appropriate, should the further processing not be carried out to prepare or cure polymer compositions such as hardened or fully cured polymers, the fabrication composition can result which itself may be used later in the further processing. Thus, for example, the plasticizer may be added to the B-stage of a polyurethane; it may be added to epoxy mixing or storage components such as to a monomer mixture or a prepreg; it may be added to an A-stage or even B-stage resole or melamine resole for reaction to the C-stage; it may be added to olefin or conjugated diene monomer; and so forth, to provide fabrication compositions.

However, added amounts of the plasticizer of this invention not only may be analogous to those known in the art for analogous plasticizing/softening additives but also may be significantly greater. For instance, in general, amounts of the plasticizer may be from about 0.1 to about 60 wt % of polymer, often from about 5 to about 50 wt % of polymer. As the case may be, loading levels of the plasticizer, i.e., amount of plasticizer that remains compatible within the polymer system, can significantly exceed those of known plasticizing/softening additives. For example, epoxy loading limits with the plasticizer can be up to about 36 wt % or higher, and polyurethane loading limits with the plasticizer can be from 10, 20 or 30 to about 40 wt % or higher.

Also, properties of the plasticizer-polymer composition, even at high loading levels, can remain good or even be improved. For example, with epoxy systems, added chemical resistance, e.g., to acids and hydrocarbons, and good electrical insulation at the high loading limits, e.g., from about 15, especially from about 20, about 25 or about 30, to about 40 wt %, are shown, and even at loading levels of about 34 wt %, not much if any of the desirable physical properties such as strength and toughness are lost. Other thermoset systems highly loaded with the plasticizer can be provided with excellent flexibility at reduced temperatures, and yet the plasticizer does not exude or bleed at higher temperatures. Elastomer systems show excellent water-repellant properties.

The following examples further illustrate the invention.

EXAMPLE 1

Butadiene is polymerized with a mixture of 65 wt % di- and 35 wt % triisopropylbiphenyl plasticizer, which plasticizer is commercially available as SURE SOL®-300. The plasticizer is present in an amount of 20 wt % and is added prior to polymerization. The plasticized polybutadiene polymer shows excellent water repellence, especially when it is compared with DBP-polybutadiene systems.

EXAMPLE 2

A castable polyurethane composition is made as follows: B-stage components made of 558.82 parts by weight (pbw) of polyethylene glycol polyol ether; 2.1 pbw of the surfactant nonylphenoxypoly(ethyleneoxy)ethanol (GAF Igepal®CO-630); 2.08 pbw of the catalyst methylene diisocyanate; and 440 pbw of the SURE SOL®-300, are contacted and mixed with a mixer to make 1000 g of polyurethane fabrication composition. The A-stage is 150 g of the isocyanate diphenylmethane diisocyanate. The A-stage and B-stage are mixed together and cured to provide a plasticizer-polyurethane composition having 44 wt % SURE SOL®-300.

The plasticizer-polyurethane composition remains flexible, even at sub-zero (F) temperatures. The SURE SOL®-300 does not bleed at normal or summertime temperatures as high as 120° F.

EXAMPLE 3

An epoxy composition is made as follows: 80 g of an epoxy resin of epichlorihydrin condensed with bisphenol-A (EPON-828) is contacted with 20 g of SURE SOL®-300 and mixed to provide a fabrication composition. The fabrication composition is mixed with 11.5 g of an amine hardener such as triethylenetetramine (TETA (D.E.H. 24)). Six polymer sample sets are prepared. The following is observed:

ASTM D-2393 FABRICATION COMPOSITION BROOKFIELD VISCOSITY:
  100 RPM spindle #3: 2624 cps.
ASTM D-2471 GEL TIME: 45.7 minutes.

|  | Sample 1 | Sample 2 | Sample 3 |
|---|---|---|---|
| ASTM D-2240 SHORE D HARDNESS (20 mil film on sandblasted steel panel): | 74 | 74 | 73–74 |
| ASTM D-790 FLEXURAL STRENGTH, psi: | 11750 | 12220 | 11330 |
| ASTM D-790 ELASTICITY MODULUS, ps | 435000 | 450000 | 422000 |
| ASTM D-638 TENSILE STRENGTH, psi: | 7320 | 7820 | 7800 |
| ASTM D-1002 STEEL BOND STRENGTH, psi: | 1620 | 1420 |  |
| ASTM D-543 CHEMICAL RESISTANCE, 14-day immersion wt % gain: |  |  |  |
| 20% HCl: | 0.03 | 0.12 |  |
| 50% NaOH: |  | 0.09 |  |
| ASTM D-256 METHOD A IMPACT, ft-lb/in: | 0.17 | 0.23 | 0.19 |

In addition, sample 4 shows a 14-day immersion wt % gain by ASTM D-543 in 50% NaOH of 0.06. Samples 5 & 6 show 14-day wt % gains by ASTM D-543 in toluene of 1.2 & 1.6, respectively.

EXAMPLE 4

A SURE SOL®-300-epoxy composite is formulated to have 28 wt % SURE SOL®-300 and is compatible with the system. The epoxy resin is EPON 828, and the hardener is TETA. Properties of the plasticizer-polymer composite remain good.

In contrast, the same epoxy system but with 10% DBP as the plasticizing/softening additive begins to lose its properties.

EXAMPLE 5

A SURE SOL®-300-epoxy composite is formulated to have 34 wt % SURE SOL®-300 and is compatible with the system. The epoxy resin is EPON 828, and the hardener is TETA. Properties of the plasticizer-polymer composite remain good.

In contrast, the same epoxy system but with 10% DBP as the plasticizing/softening additive begins to lose its properties.

EXAMPLE 6

A SURE SOL®-300-epoxy composite is formulated to have 36 wt % SURE SOL®-300 and is compatible with the system. The epoxy resin is EPON 828, and the hardener is TETA.

In contrast, the same epoxy system but with 25% DBP as the plasticizing/softening additive begins to lose its compatibility.

CONCLUSION

The present invention is thus provided. Numerous adaptations and modifications can be effected and remain within the scope of the invention.

What is claimed is:

1. A method for preparing a plasticized polybutadiene-containing polymer composition, which comprises the steps of:
    (a) contacting a monomer and/or oligomer component with a plasticizer, said monomer and/or oligmer component being a precursor of polybutadiene and a major proportion by weight of said plasticizer being diisopropylbiphenyl and/or triisopropylbiphenyl,
    (b) mixing together the monomer and/or oligomer component with the plasticizer to provide a uniform mixture; and
    (c) carrying out further processing of the mixture to prepare the plasticized polymer composition.

2. The method as set forth in claim 1, wherein said major proportion by weight of said plasticizer is a mixture of diisopropylbiphenyl and triisopropylbiphenyl.

* * * * *